Feb. 12, 1929.   1,702,191
J. C. BERGNER
MACHINE FOR FORMING PASTRIES AND THE LIKE
Filed Oct. 13, 1919   5 Sheets-Sheet 2
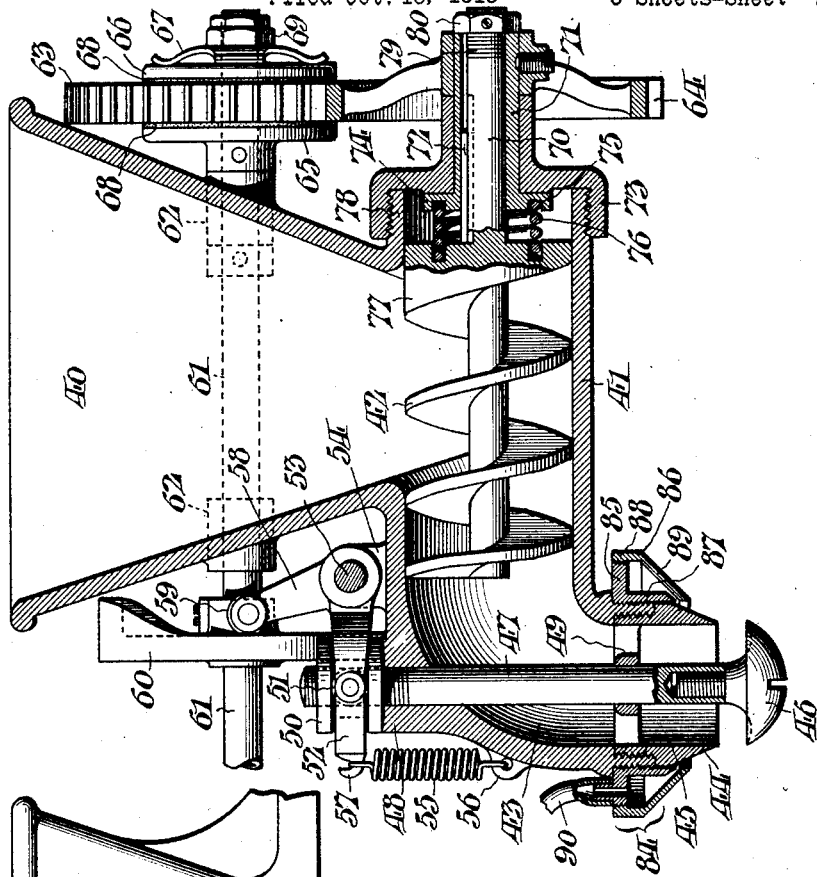
FIG. V.
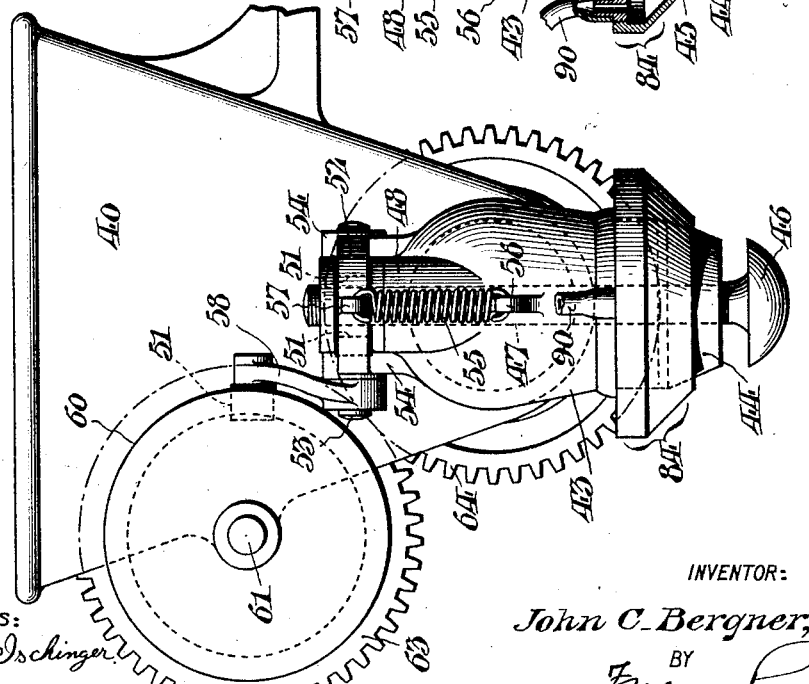
FIG. IV.
WITNESSES:
Alfred E. Ischinger
James C. Bell
INVENTOR:
John C. Bergner,
BY
Foley + Paup
ATTORNEYS.

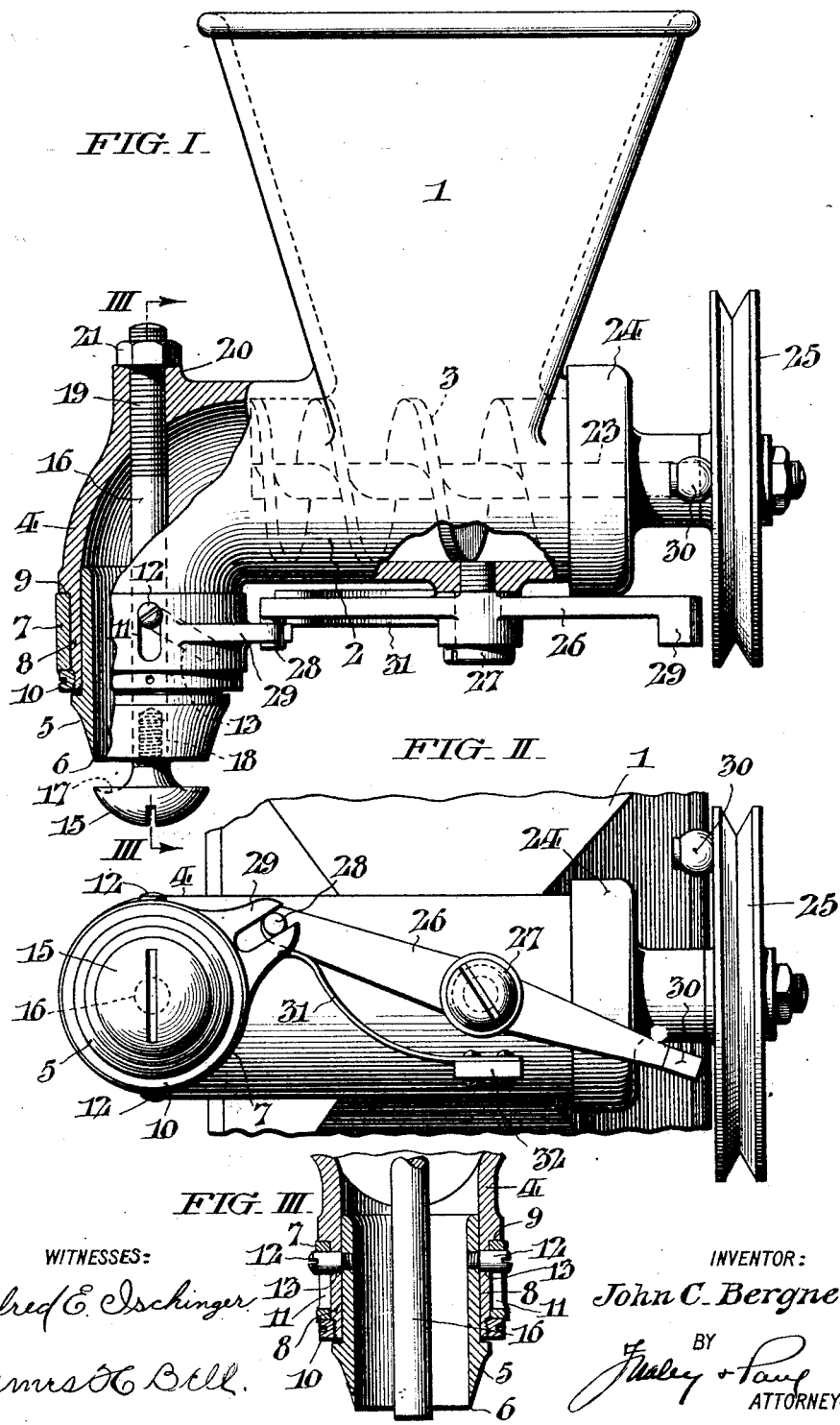

Feb. 12, 1929.
J. C. BERGNER
1,702,191
MACHINE FOR FORMING PASTRIES AND THE LIKE
Filed Oct. 13, 1919 5 Sheets-Sheet 3
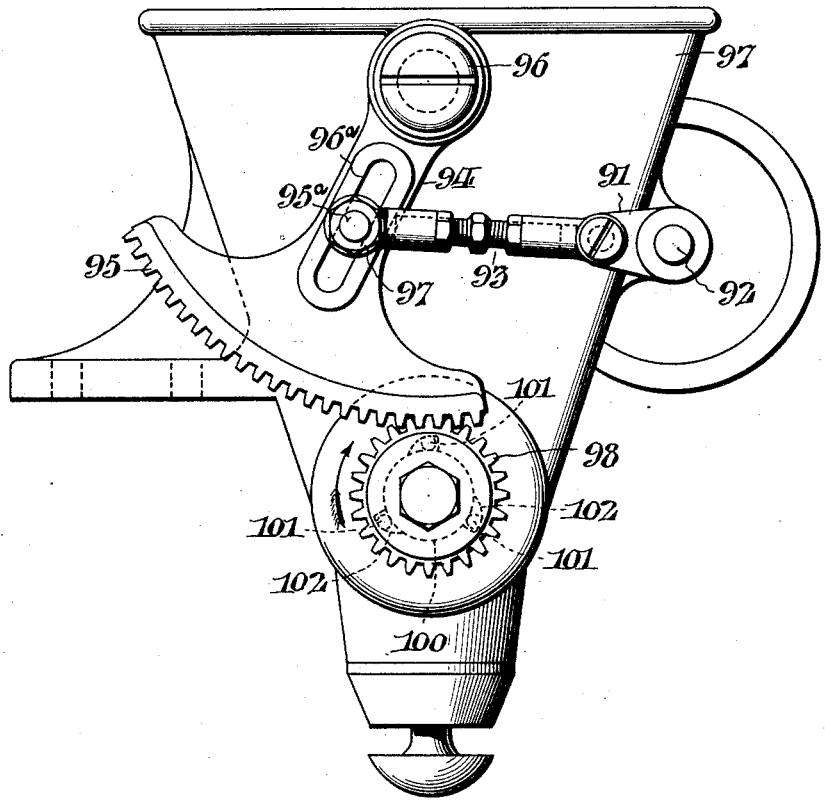
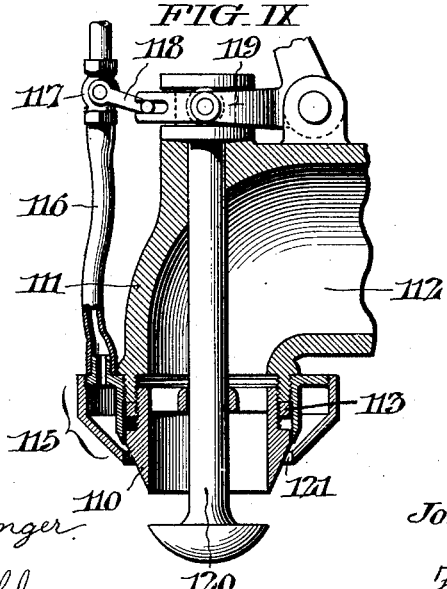
WITNESSES:
INVENTOR:
John C. Bergner,
BY
ATTORNEYS.

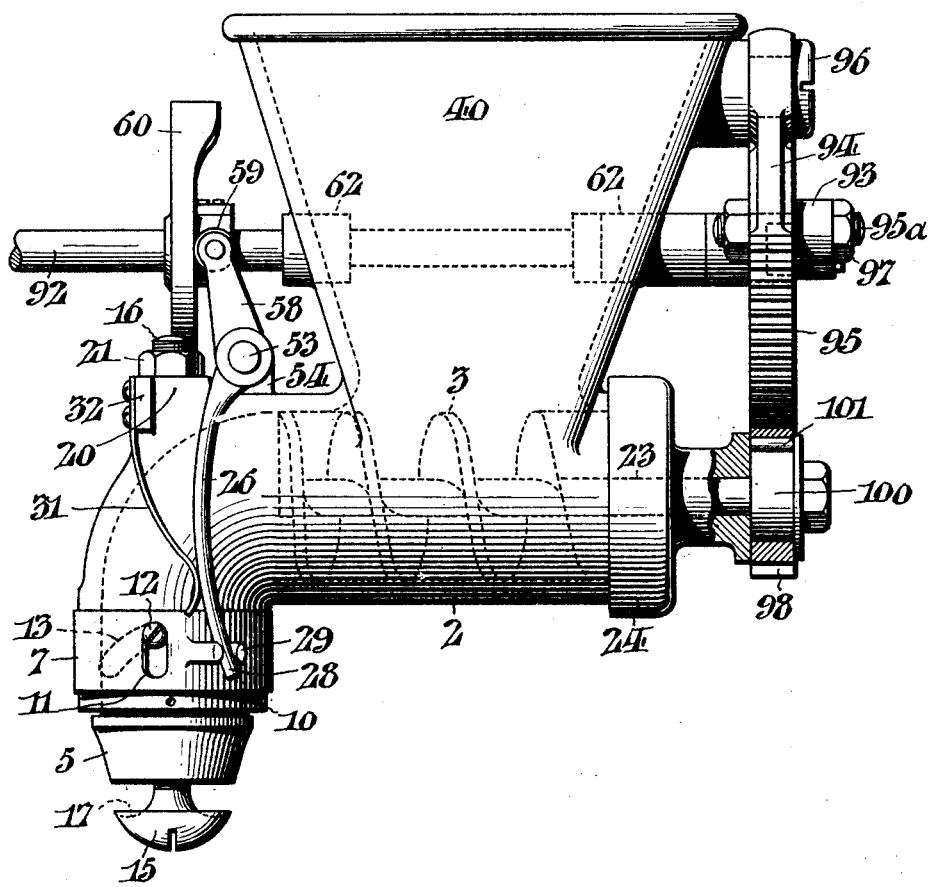

Feb. 12, 1929.
J. C. BERGNER
1,702,191
MACHINE FOR FORMING PASTRIES AND THE LIKE
Filed Oct. 13, 1919 5 Sheets-Sheet 5
FIG. VIII.
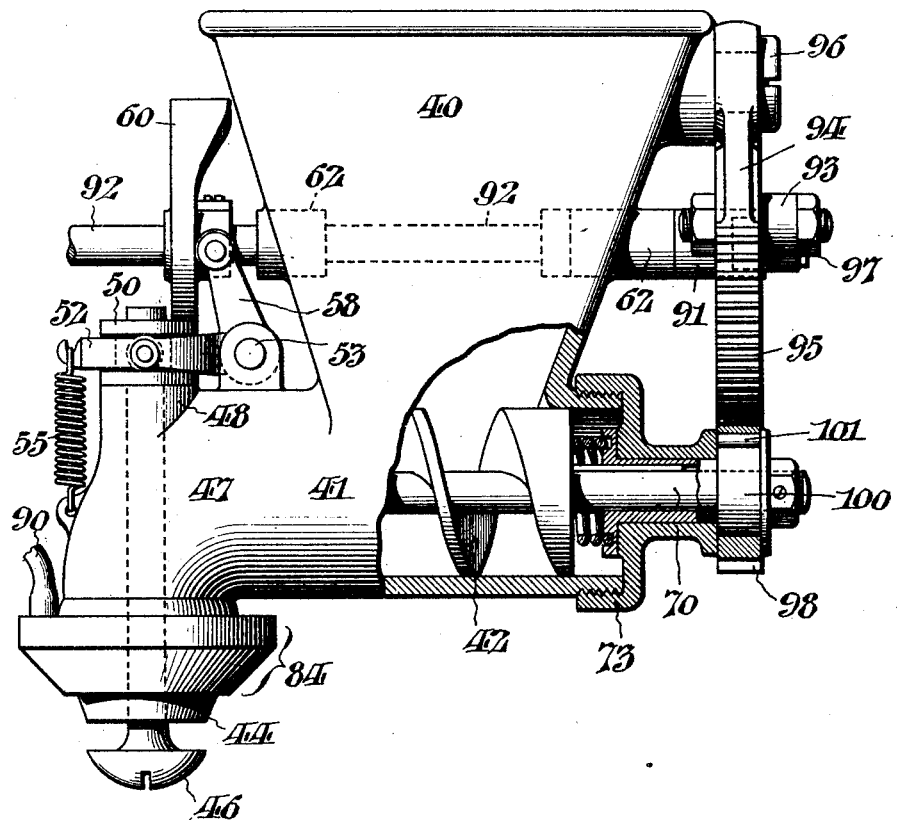

Patented Feb. 12, 1929.

1,702,191

UNITED STATES PATENT OFFICE.

JOHN C. BERGNER, OF PHILADELPHIA, PENNSYLVANIA, ASSIGNOR OF ONE-HALF TO FRANK ELLIS MORRIS, OF PHILADELPHIA, PENNSYLVANIA.

MACHINE FOR FORMING PASTRIES AND THE LIKE.

Application filed October 13, 1919. Serial No. 330,235.

The invention relates to machines more especially useful to bakers and confectioners in effecting the formation of pastries or similar products, which may be made of substances or mixtures sufficiently plastic to be capable of being forced through appropriate shaping dies.

The invention is directed primarily to a machine of the above character, which is continuous in operation, and in which, the extrusion from the die is severed with precision, and in such manner as to prevent distortion of the resulting formations.

The invention also comprehends means whereby the quantity of extrusion may be accurately regulated so as to produce formations of any desired size.

The invention is further directed to cooperative annular cutting elements which are adapted to rotate relatively as they approach one another so as to effect a clean severance of the extrusion.

The invention also comprehends a forming machine comprising a die element, and co-operative feeding means for extruding a plastic substance through the die element, said means being alternatively operative with respect to the mechanism by which the extrusion is severed.

A further object of the invention is to provide a feeding means which has capacity for yielding to forced inactivity in the event of abnormal back pressure thereon.

Means are also provided by which the release or doffing of the severed formations is assured against any possibility of adherence to the elements by which the cutting is effected.

My invention lends itself readily to embodiment in several different forms, which will be taken up successively and which will be better understood from the detailed description which follows:

In the accompanying drawings, Fig. I is an illustration, partly in elevation, and partly in section, of a forming machine conveniently embodying my invention.

Fig. II is an inverted plan of the structure shown in Fig. I.

Fig. III is a detailed sectional view along the plane indicated by the arrows III—III, in Fig. I.

Fig. IV is an end elevation of a machine, embodying my invention in another form.

Fig. V is a longitudinal sectional view through the organization shown in Fig. IV.

Fig. VI is a rear end elevation of still another form of my invention illustrating more particularly an intermittent drive for the means by which extrusion is effected; and Fig. VII is a corresponding side elevation, with some parts in section as in Fig. V.

Fig. VIII is a side elevation, similar to Fig. VII, showing the same feed mechanism in connection with the die mechanism of Figs. I, II and III.

Fig. IX is a detail sectional view through the die outlet showing additional modifications whereby relative adjustment may be had between co-operative cutting elements, and also an alternative form of means by which the doffing of the severed formations is assured.

Referring first to Figs. I, II, and III, it will be seen that the type of device there embodied, comprises a supply hopper 1, communicative with, and forming an integral part of the horizontal cylindrical casing 2, which serves as a housing for a feeding device, preferably in the form of an auger 3. At its left hand end, (Fig. I) casing 2, terminates in a downward turned extension constituting an outlet 4. Received within the mouth of the outlet 4, is the reduced upper end of an annular die element 5, having the cross sectional configuration clearly shown in Figs. I and III. The lower portion of said element is beveled at a sharp angle to afford a circular cutting edge 6. Die member 5, is adapted for simultaneous rotation and axial shifting within the mouth of the outlet 4, and to this end, is connected to suitable actuating devices for bringing this motion about. These devices include a collar 7, freely rotatable about the reduced portion 8, of the outlet and held from displacement between a shoulder 9, and a retainer nut 10, threaded on the lower end of the outlet. As shown in Figs. I and III, the collar 7, is provided with diametrically opposite vertical slots 11, within which are engaged pins 12, threaded or otherwise secured into the die member 5. These pins extend through inclined cam slots 13, in the wall of the outlet, and it will be seen that on rotation of the collar 7, the pins 12, by reason of their engagement within the vertical slots 11, will be obliged to follow. In the course of their movement, said pins will engage the edges of the inclined cam slots, and be thereby depressed to shift the die element 5, until it slightly overlaps a coaxial, stationary cutter element, which, in the present instance, comprises a semi-spherical head 15, appended to a shank 16, of comparatively smaller diameter. It will be noted that the upper face of the head 15, is concaved as at 17, so as to provide a sharp peripheral cutting edge adapted for co-operation in opposition to the lower cutting edge portion of the die element 5. It is to be further noted that the attachment of the head 15, is effected by a threaded extension 18, let into the lower end of the shank 16, so that removal may be readily effected either for replacement, or to permit access to the outlet for cleaning purposes. The upper end of the shank 16, is threaded into an integral boss 20, of the casing 2. By this arrangement, the cutter element 15, may be adjusted with respect to the die element 5, so that the interspace between said elements, when in the normal position shown in Fig. I, may be varied to control the flow from the outlet 3. This adjustment is fixable by means of a jam nut 21, operative against the face of the boss 20.

The feed auger 3, is formed with an integral shaft extension 23, having bearing in a removable cap 24, threaded or otherwise removably attached to the end of the casing 2. To the protruding end of the shaft 23, is secured a driving element in the form of a grooved pulley 25.

The function of actuating the collar 7, is in the present instance, vested in a lever 26, fulcrumed intermediate its ends about a stud screw 27, threaded into the casing 2. The left hand end of the lever has an integral projection 28, operative within a bifurcated extension 29, of the collar. The opposite end of the lever has a terminal wing 29, which lies within the path of a spherical roller 30, carried by the driving element 25. Thus, for each rotation of the member 25, the end of the lever 26, is engaged by the roller 30, and the induced movement is translated in the opposite direction to effect partial rotation of the collar 7, through the interposed connections already understood. These parts are restored to their normal positions (shown in the drawings) by a spring 31, bearing upon the side of the left extremity of the lever 26, and having its anchorage in a lug 32, projecting downwardly from the casing.

From the above construction, it will be seen that the operation of the device is such that the die element 5, is periodically rotated, and at the same time axially shifted with respect to the cutter element 15, so that the extrusion from the outlet effected by the auger 3, is severed and consequently freed to drop into any appropriate receiver which may be provided for the purpose. The operation of the cutting elements is substantially instantaneous, so that severance may be readily effected without interfering with the constant rate of flow of the plastic.

Referring now to the type of my invention shown in Figs. IV and V the hopper is here indicated at 40, and serves in the same manner as that previously described. Also, like in the previous form, said hopper is communicative with an integral, horizontal, cylindrical housing 41, in which operates an auger 42. Said housing further comprises a downwardly turned outlet 43, to the lower end of which is removably secured a die element 44, preferably by threaded engagement as shown at 45. Co-operative with the said die element 44, is a plunger cutter 46, having the same general characteristics as the corresponding element in the first described form, but in this case movable with respect to the element 44. To this end, the shank 47, of the cutter element 46, has bearing at its upper end in an integral boss 48, of the casing 41, and at its lower end, in a web 49, spanning the outlet 43. To the upper end of the shank 47, is threaded a grooved collar 50, which is engaged by rollers 51—51 carried by a yoke arm 52, fixed to a rock-shaft 53, mounted in bearings 54, extending from the casing 41. The cutter member 46, is normally retained in the position shown in the drawings by means of a helical tension spring 55, spanned between a fixed anchorage lug 56, on the outlet 43, and a projecting hook 57, formed on the yoke arm 52. The cutter element 46, is actuated by means of a rocker arm 58, also secured to the rock-shaft 53. Said arm 58, carries at its outer end, a roller 59, which co-operates with a disc cam 60, fixed upon a driving shaft 61, journalled in suitable bearings 62—62, preferably integrally formed with the feed hopper 40. Referring to Fig. V it will be seen that at its opposite end, the said shaft carries a gear 63, which drives, by means of an intermeshing gear 64, the feed auger 42. The gear 63, is not directly attached to its mounting shaft, but is interposed between a fixed disc 65, thereon, operative against one side of the gear, and a loose disc 66, operative against the opposite side of said gear, under compression of a disc spring 67. Suitable friction gaskets 68, of any approved material may be incorporated in the structure to increase the efficiency of the contact with the gear 63. Pressure between these elements may be adjusted by a nut 69, threaded upon the outer end of the shaft 59, and directly effective upon the disc spring 67. Thus in case of abnormal pressure acting against the auger, e. g., by the accidental introduction into the hopper of an unyielding or solid substance, the yielding drive afforded by the parts just described will permit slipping and lost motion, and thereby protect the device from injury.

In the operation of this form of my invention tion, the cutter member 46 acts in a direction opposed to that of the flow of extrusion. In order to compensate for the attendant back pressure, the integral shaft 70, of the auger 42, is slidably mounted within a driving sleeve 71, having a splined connection indicated at 72, and journalled in a cap bearing 73. To the driving sleeve 71, is fixed the gear 64, already described, and its inner end is flanged to form a disc 74, whose face is recessed at 75, to afford a seat for a helical compression spring 76. The opposite end of said spring is received in a similar annular recess in the face of the end disc 77, of the auger 42. This disc 77 lies within an extension 78, of the casing 41, within which the spring is located. In order that the tension of the spring may be varied, the outer end of the shaft is threaded as indicated at 79, for co-operation with a nut 80, which bears against the outer end of the sleeve 71. By this arrangement, the auger may shift axially under the flexibility afforded by the spring 76, for the purpose noted.

Associated with this form of my invention, I have shown a device which is functional in assuring the doffing of the severed formation against any tendency to adhere to the cutting elements. This device is in the form of a hollow annulus 84, comprising the constituent members 85 and 86, the former being directly attached to the outlet 84, preferably by threaded engagement as indicated at 87. The member 86, is made adjustable with respect to the member 87, by a screw connection at 88. The purpose of this adjustment is to permit the regulation of the annular outlet space between the lower edge of the member 85, and the sloping wall 89, of the member 86. This slope tends to direct the charge inwardly against element 44. A fluid lubricant is supplied to the device 84, by means of a tube connection 90. Thus, for example, when the device is employed say in the formation of doughnuts, a constant discharge of hot grease from the annular diffusing outlet of the device 84, will serve to keep the die member 45, heated, and, at the same time, lubricated to prevent adhesion of the dough after the cutting is effected. In some cases, the supplemental doffing device just described may be dispensed with altogether since the sudden jar upon the cutter element under the force of the spring 55, when released by the cam 60, may be relied upon to effect stripping without additional aid.

Referring now to Figs. VI and VII, I have shown still another form and embodiment of my invention. This modification is directed more especially to means for driving the auger whereby it may be operated intermittently and in alternation with respect to the action of the cutting elements; a mode of operation obviously applicable in connection with either of the forms of cutting die already described. This structure includes a crank 91, attached to a drive shaft 92, such as that shown at 61, in Figs. VI or V, or to an equivalent thereof. This crank is connected by a longitudinally adjustable link rod 93, with the radial arm 94, of a gear sector 95, having its fulcrum about a suitable stud screw 96, let into the hopper structure 97. The point of attachment of the end of the connector 93, to the radial arm 94, of the sector is longitudinally shiftable along the length of said arm. Attachment is effected by means of a pin or bolt 95$^a$, traversing a slot 96$^a$, and clampable by means of a nut 97. By shifting this point of attachment along the arm of the sector, the effect of the throw of the crank 91, may be either increased or decreased as desired. The gear sector 95, meshes with a pinion 98, mounted upon the outer end of the drive sleeve 100, for the auger, which is similar to that described in connection with a previous form. The mounting of the pinion upon the sleeve is such that it is effective as a drive only when rotating in the direction of the arrow in Fig. VI. The devices by which rotative selection is effected include a series of roller pins 101, located within cam notches 102, suitably formed in the hub of the pinion 98. Thus as the gear is driven in the direction of the arrow, these rollers are wedged, and serve to bind the gear to the sleeve, but, when the pinion rotates in the opposite direction a release is effected, and the pins merely roll freely in the cam notches. Such a structure is not claimed as new herein, it being shown merely as an example by which the drive of the gear is effective only in one direction upon the auger, and it will be understood that any other equivalent device may be employed to the same end. From the above construction, it will be seen that by adjusting the pin 95, longitudinally of the arm 94, of the gear sector, the throw of the latter, and consequently the extent of rotation imparted to the pinion 98, may be varied, and consequently the amount of the plastic extruded through the die outlet member, very accurately controlled. Furthermore, if this drive be employed in the connection with the apparatus shown in Figs. IV and V, the effective throw of the crank will be so timed as to operate in alternation with the action of the cutter elements so that the plastic is first extruded, and then severed. In Fig. VII, various parts not mentioned in the foregoing description of this modification have been marked with the same reference numerals as in Figs. IV and V, as a means of dispensing with merely repetitive description.

In Fig. VIII, the die mechanism of Figs. I, II, and III is shown with the feed mechanism of Figs. VI and VII. On Fig. VIII, therefore, the various parts have been marked with reference numerals in correspondence to Figs. I, II, III, VI and VII, as a means of dispensing with description that would be merely repetitive.

Lastly, referring to Fig. IX I have there shown and embodied a means of adjusting the die member, in this case numbered 110, with respect to the outlet 111, of the auger casing 112. The attachment is effected by screw threaded engagement as before, and the adjustment is fixable by means of a jam nut 113, thus affording an alternative method of regulating the interval between the cutting members of the device.

This figure further illustrates an alternative means for insuring the doffing or stripping of the formations by the use of air under pressure instead of a heated lubricant. The member 115, is constructed upon similar lines as the device 84, already described, and in this case compressed air is intermittently supplied thereto by a pipe 116, under the control of an interposed valve 117, whose operating crank 118, is engaged by the end of the yoke arm 119, by which the cutter plunger 120, is actuated. Thus, at each upward movement of the member 120, during the cutting operation, the valve 117, is momentarily opened, thereby permitting diffusion through the outlet 121, of the member 115, and impingement against the extrusion during severance.

It is to be understood that either the type of the doffing device shown in Fig. V or that in Fig. IX, may be employed in connection with any of the forms of cutter mechanism previously described. It is to be further understood that I do not wish to limit myself to the precise construction and arrangement herein shown, since my invention is susceptible of various other modifications without departing from the spirit thereof. Furthermore, it is to be understood that the principles involved are not to be definitely limited to the specific practical application herein before set forth.

Having thus described my invention, I claim:

1. In a device of the character described, the combination of an annular die element; a holder for said die element; a cutter element operatively associated with said die element and co-axially aligned therewith; means for relatively rotating, and at the same time shifting said die element axially with respect to said cutter element, including a collar freely rotatable about the holder for the annular die element, and slotted to engage projections on the annular die element, said projections extending through co-operative inclined cam slots in the holder element.

2. In a device of the character described, the combination of an annular die element; a holder for said die element; a cutter element operatively associated with said die element and co-axially aligned therewith; means for relatively rotating, and at the same time shifting said die element axially with respect to said cutter element, including a collar freely rotatable about the holder for the annular die element, and slotted to engage projections on the annular die element, said projections extending through co-operative inclined cam slots in the holder element; devices for positively shifting said collar to effect the cutting operation; and resilient means for subsequently restoring said collar to its normal position.

3. In a machine of the class described for producing annular formations of plastic material, the combination of die mechanism comprising a cutter element, and an annular cutting die element movable axially relative thereto to open and close an annular opening for extrusion of the material; means for feeding the material to the die mechanism, including a feed device and means for operating it to periodically feed the material as aforesaid, and for regulating the amount of material so fed each time; and means for periodically actuating said cutting die element, to sever the extruded material, in definite correlation with the operation of said feeding means.

4. In a machine of the class described for producing annular formations of plastic material, the combination of supply means for the plastic material; die mechanism comprising a cutter element, and an annular cutting die element movable axially over and off of said cutter element; means for feeding the material from said supply means to said die mechanism; including a feed device interposed between supply means and die mechanism, with means for periodically actuating said device, and for regulating the amount of material fed thereby at each actuation; and means for periodically actuating said cutting die element, to sever the extruded material, in definite correlation with the operation of said feeding means.

5. In a machine of the character described for producing annular formations of plastic material, the combination of die mechanism comprising an inner cutter element and an outer annular cutting die element, said elements being movable axially relative to one another, one over and off of the other, so as, on the one hand, to open and afford an annular die outlet for extrusion of the material in annular formations, and, on the other hand, to close said die outlet and sever and doff the annular formations as such; means for operating said die mechanism to open and close said die outlet and thereby produce, sever, and doff the extruded annular formations as aforesaid; and means for feeding the material to the die mechanism actuated by said operating means and regulatable to control the extent of extrusion at each operation of the die mechanism.

6. In a machine of the character described for producing annular formations of plastic material, the combination of die mechanism comprising an inner cutter element and an outer annular cutting die element, said elements being movable axially relative to one another, one over and off of the other, so as, on the one hand, to open and afford an annular die outlet for extrusion of the material in annular formations, and, on the other hand, to close said die outlet and sever and doff the annular formations as such; means for feeding material to the die mechanism, including a feed device with means for periodically actuating it, and for varying the amount of material fed by it at each actuation; and means for periodically actuating said die mechanism in definite correlation with the operation of said feeding means.

7. In a machine of the character described for producing annular formations of plastic material, the combination of die mechanism comprising an inner cutter element and an outer annular cutting die element, said elements being movable axially relative to one another, one over and off of the other, so as, on the one hand, to open and afford an annular die outlet for extrusion of the material in annular formations, and, on the other hand, to close said die outlet and sever and doff the annular formations as such; means for feeding the material to the die mechanism; and operating means interconnecting the die mechanism and the feeding means, including means for periodically shifting said die elements to close the die outlet temporarily and quickly open it again, so as to sever and doff the annular formations as aforesaid with minimum interruption to the flow of material.

In testimony whereof, I have hereunto signed my name at Philadelphia, Pennsylvania, this 10th day of October, 1919.

JOHN C. BERGNER.

DISCLAIMER 1,702,191.—*John C. Bergner*, Philadelphia, Pa. MACHINE FOR FORMING PASTRIES AND THE LIKE. Patent dated February 12, 1929. Disclaimer filed June 29, 1934, by the assignee, *Doughnut Corporation of America*.

Hereby disclaims from claims 3, 4, 5, 6 and 7 of said Letters Patent any apparatus except an integral, unitary machine for use with a doughnut cooking machine, including a gravity-feed, hopper for raw dough, a communicating passage therefrom to feeding means, a cooperating intermittently operated feeding and measuring means, a cooperating channel therefrom to the severing means, and cooperating severing means in which the cutter element has a severing edge around its circumference and the annular cutting die element has a peripheral severing edge around the inner circumference of its lower end, said severing edges in operation moving axially past each other, so as to sever the measured amount of extruded material at one and the same time from and around the circumferences of the severing edges without adherence of the dough to them.

[*Official Gazette July 24, 1934.*]